(12) United States Patent
Ricker

(10) Patent No.: US 7,063,490 B2
(45) Date of Patent: Jun. 20, 2006

(54) HYDRAULIC NUT, DEVICE AND METHOD FOR MOUNTING OR DISMOUNTING A HOLLOW ARTICLE

(75) Inventor: Stephen L. Ricker, Ann Arbor, MI (US)

(73) Assignee: NSK Corporation, Ann Arbor, MI (US)

( * ) Notice: Subject to any disclaimer, the term of this patent is extended or adjusted under 35 U.S.C. 154(b) by 0 days.

(21) Appl. No.: 10/660,706

(22) Filed: Sep. 12, 2003

(65) Prior Publication Data

US 2005/0058520 A1  Mar. 17, 2005

(51) Int. Cl.
*F16B 31/02* (2006.01)

(52) U.S. Cl. .................. 411/14; 411/14.5; 411/434
(58) Field of Classification Search .............. 411/14, 411/14.5, 432–434, 916, 917; 73/761
See application file for complete search history.

(56) References Cited

U.S. PATENT DOCUMENTS

| | | | |
|---|---|---|---|
| 1,510,492 A * | 10/1924 | Caron et al. ................ 411/432 |
| 2,995,033 A | 8/1961 | Stifano, Jr. | |
| 3,033,597 A | 5/1962 | Miller | |
| 3,936,104 A | 2/1976 | Brinkman | |
| 3,957,319 A | 5/1976 | Gorski | |
| 3,962,950 A * | 6/1976 | Piroska ....................... 411/434 |
| 4,411,549 A | 10/1983 | Sheppard | |
| 4,611,351 A | 9/1986 | Nakamura | |
| 4,646,411 A | 3/1987 | Hankins | |
| 4,686,859 A | 8/1987 | Wallace | |
| 5,029,461 A | 7/1991 | Lawrence et al. | |
| 5,114,289 A | 5/1992 | Coiffman | |
| 5,118,237 A * | 6/1992 | Wright ........................ 411/433 |
| 5,553,982 A * | 9/1996 | Hashikawa ................... 411/14 |
| 5,660,417 A * | 8/1997 | Reeves ......................... 285/93 |
| 5,685,068 A | 11/1997 | Bankestroem et al. | |
| 5,743,016 A | 4/1998 | Manne et al. | |
| 5,779,419 A | 7/1998 | Kellstroem et al. | |

FOREIGN PATENT DOCUMENTS

| | | |
|---|---|---|
| DE | 1108629 B1 | 6/1961 |
| DE | 2052788 A1 | 5/1972 |
| FR | 2619428 A1 | 1/1990 |
| GB | 2060186 A | 4/1981 |
| SU | 1418526 A | 8/1988 |
| WO | WO-92/19878 A2 | 11/1992 |

* cited by examiner

*Primary Examiner*—Flemming Saether
(74) *Attorney, Agent, or Firm*—Crowell & Moring LLP

(57) ABSTRACT

A hydraulic nut having a piston which is movable in a fluid chamber of a nut body and which has a radial protrusion from the piston and a displacement bar mounted on the protrusion. The displacement bar overlies the nut body and extends past the nut body by an amount equal to the distance through which the hydraulic nut is to move a bearing assembly along a tapered shaft or move an adapter sleeve, or removal sleeve with bearing assembly on them.

26 Claims, 5 Drawing Sheets

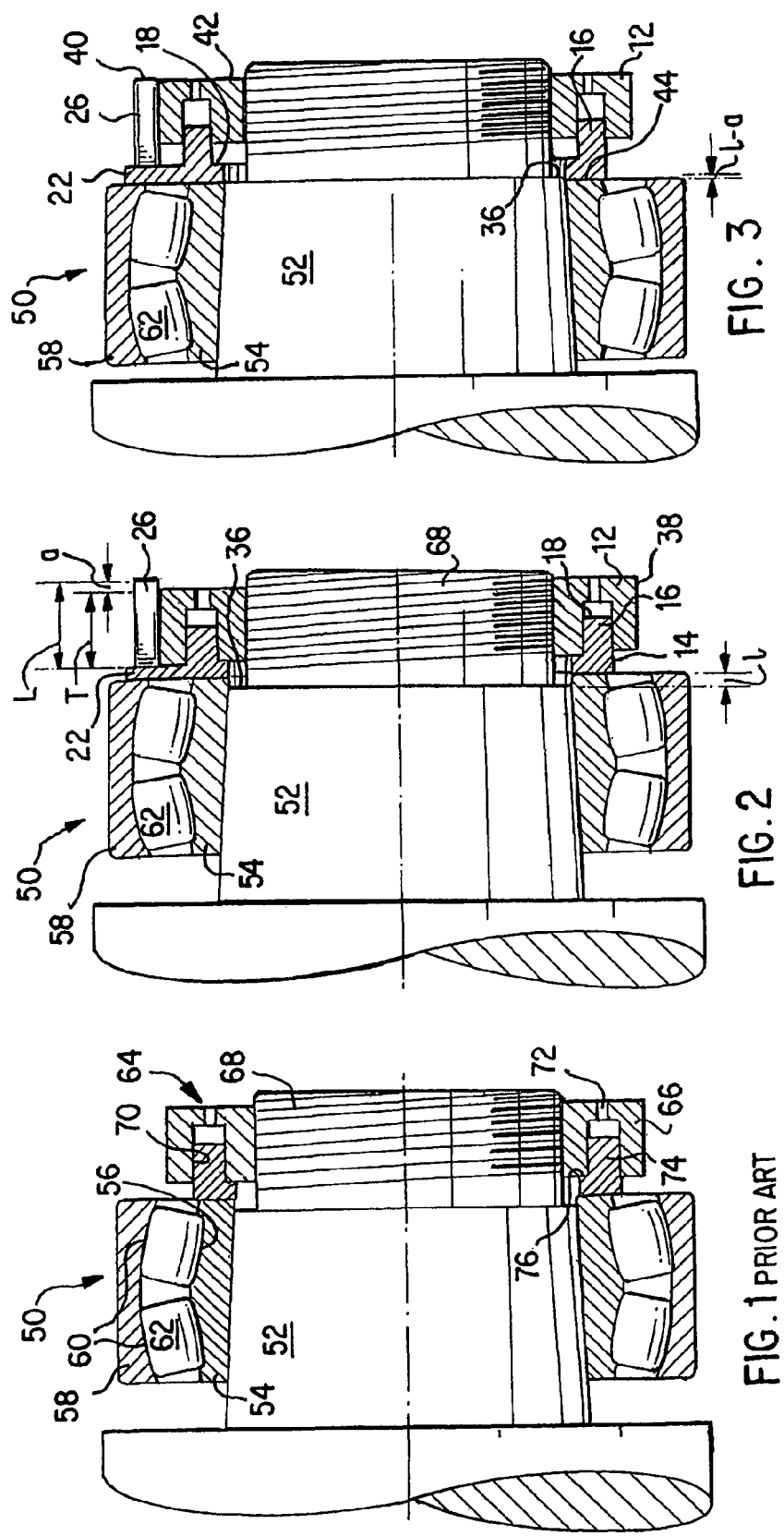

HYDRAULIC NUT, DEVICE AND METHOD FOR MOUNTING OR DISMOUNTING A HOLLOW ARTICLE

BACKGROUND AND SUMMARY OF THE INVENTION

This invention relates to hydraulic nuts and, more particularly, this invention relates to a device and method for mounting and dismounting a bearing on a tapered shaft or the like.

Hydraulic nuts per se are well-known in the art. They are used, for example, to assist in mounting and dismounting bearing assemblies on shafts, especially tapered shafts. A bearing assembly can be mounted on a shaft, in particular a tapered shaft, only to a point where the press fit becomes too tight to axially slide the bearing assembly any further. Yet, the position may not be correct or, in the case of a preloaded bearing, the preload might not be correct and, therefore, the clearance may not be correct. Hydraulic nuts are often used to easily and precisely position a bearing assembly on a shaft. U.S. Pat. No. 5,685,068, for instance, teaches the use of a hydraulic nut to assist in mounting bearings on a tapered shaft. U.S. Pat. Nos. 4,611,351 and 5,743,016 teach the use of a hydraulic nut for mounting preloaded bearings on a shaft. U.S. Pat. No. 3,033,597 teaches the use of a hydraulic nut to mount and dismount gears on a shaft.

A typical arrangement using a hydraulic nut to assist in mounting a bearing assembly on a tapered shaft is shown in FIG. 1. There is shown a bearing assembly generally designated by the numeral 50 press fit onto a shaft 52. Spherical roller bearings are shown but other types of bearings such as double row ball bearings are often mounted in the same manner. Bearing assembly 50 comprises an inner ring 54 having a pair of inner raceways 56 and an outer ring 58 having a pair of outer raceways 60. Rolling elements 62 are disposed between opposed inner and outer raceways 56 and 60. Bearings 62 could be spherical roller bearings or ball bearings. As can be seen in FIG. 1, the inner ring 54 of bearing assembly 50 can be mounted on the shaft 52 to a press fit only to a certain point without applying additional pressure to move it to the desired position or to apply the required amount of preload and to take out the clearance.

To that end, a hydraulic nut generally designated by the numeral 64 is used. Hydraulic nut 64 comprises a nut body 66 which has internal threads and is screwed onto a portion 68 of shaft 52 which is externally threaded. Nut body 66 has an annular chamber 70 which is coaxial with the nut body and is operatively connected to a source of fluid pressure (not shown) through a suitable connector and fluid passage 72. While passage 72 is shown as an axially directed passage, it can equally well enter the nut body from a radial direction. The fluid is typically an oil but can be any fluid well-known in the art for the purpose. An annular piston 74 which could have an inwardly directed flange 76 is seated in chamber 70. Piston 74 abuts inner ring 54. Alternatively, the piston 74 could rest against an adapter sleeve which, in turn, rests against the inner ring, as shown in U.S. Pat. No. 3,957,319. Fluid pressure is applied to the hydraulic nut 64 to force piston 74 to the left as seen in FIG. 1, thereby applying sufficient uniform pressure to inner ring 54 to push the bearing assembly further onto shaft 52. When the bearing assembly 50 has reached the desired position or has achieved the desired preload and clearance, the fluid pressure is relieved. The hydraulic nut could be removed or could be left in position if it could serve some other purpose.

The aforementioned prior art is concerned with providing methods and means for mounting bearings, gears, or the like, on shafts; they are not drawn to the measurement of the amount of pressure to be applied while doing so. U.S. Pat. No. 5,779,419 (hereinafter referred to as "the '419 patent") teaches a hydraulic nut which includes means for indirectly measuring the axial displacement of the piston with respect to the nut body. In this construction, the piston has an outwardly extending annular flange and the nut body has a through-bore which is partly threaded and aligns with the outwardly extending flange. A distance measuring device comprising a dial indicator, a screw threaded housing, and a sensing pin is mounted in the bore with the sensing pin bearing against the outwardly directed flange. As the piston moves under the oil-pressure generated force, the sensing pin moves with it and a reading is made from the dial indicator. Indicator readings are converted to useful dimensional units by reference to a table of values which have been determined empirically.

While the device of the '419 patent is an improvement over the devices theretofor in use, it must be kept in mind that major users of the device are maintenance personnel and its use is unduly complicated and time consuming for those users. After taking a reading from the dial it is necessary to refer to calibration tables provided by the manufacturer to calculate the distance travelled or other useful information. That means that the pressure must be occasionally paused and a measurement taken and then reference must be had to the calibration tables and the internal clearance must be measured with feeler gauges. The process is repeated until the desired axial movement is achieved and, more important, the clearance is taken out. The U.S. patents mentioned herein are all incorporated by reference in their entireties.

Accordingly, it is an object of the present invention to provide a device and method for measuring the axial movement of a bearing, gear, or the like on a shaft, in particular a tapered shaft, which is free of the aforementioned and other such disadvantages.

It is another object of the present invention to provide a device and method for directly measuring the axial movement of a bearing, gear, or the like on a tapered shaft.

It is still another object of the present invention to provide a device and method for directly measuring the axial movement of a bearing, gear, or the like on a tapered shaft which is simple and convenient to use.

Consistent with these and other objects, the present invention provides a hydraulic nut comprising:

(A) an annular nut body having a thickness T and having an annular chamber in one face thereof;

(B) a piston coaxially disposed in said chamber and axially displaceable therein, said piston having a radially extending protrusion;

(C) a displacement bar removably mounted on said protrusion and extending across the periphery of said nut body in a direction substantially parallel to the axis of said nut body;

(D) said displacement bar having a length $L=T+a$ where $a$ is a predetermined distance for axial movement of said piston.

It is most preferred that the nut body of the hydraulic nut is internally threaded.

As with the prior art hydraulic nuts, the nut body further comprises a fluid passage operatively communicating with the chamber and has a fitting for connection to a fluid source under pressure communicating with the passage.

The protrusion on the piston preferably comprises a pair of opposed lugs defining a slot therebetween. The lugs each have a through bore, the displacement bar has a through bore at one end thereof, the displacement bar is disposed in the slot with the through bores in alignment, and a locking pin is inserted in the bores to secure the displacement bar in place. Those skilled in the art will appreciate that any suitable configuration for mounting the displacement bar could be used. For example, the protrusion could be a single lug with a threaded hole and the displacement bar could have a threaded end or stud to screw into the threaded hole.

In its preferred configuration, the piston could further comprise an inwardly directed annular flange to make better contact with the inner ring of the bearing.

In another configuration, the piston can further comprise an outwardly directed annular flange, wherein the protrusion extends outwardly from the flange.

In cases where an adapter sleeve is used, the hydraulic nut is threaded onto the adapter sleeve which, in turn, is fit onto the shaft which typically is unthreaded.

For removal of a bearing assembly from a shaft, a removal sleeve is inserted between the shaft and the bearing assembly by use of the hydraulic nut and with the bearing held stationary. A hydraulic nut is then screwed onto a threaded end of the removal sleeve to force the removal sleeve off the shaft. To assemble the bearing on the removal sleeve, a hydraulic nut is threaded on the threads of a shaft. The hydraulic nut piston is then pushed against the removal sleeve while the bearing is held stationary.

Other objects, advantages and novel features of the present invention will become apparent from the following detailed description of the invention when considered in conjunction with the accompanying drawings where like numbers indicate like parts.

BRIEF DESCRIPTION OF THE DRAWINGS

FIG. 1 is a partly schematic side elevational view in cross-section showing a typical prior art hydraulic nut in use;

FIG. 2 is a partly schematic side elevational view in cross-section showing a bearing assembly in the first step of mounting on a tapered shaft with a hydraulic nut of the present invention ready for activation;

FIG. 3 is a partly schematic side elevational view in cross-section showing the bearing assembly having been mounted to its final position by the hydraulic nut of the present invention;

DETAILED DESCRIPTION OF THE PREFERRED EMBODIMENTS

Figure 4:
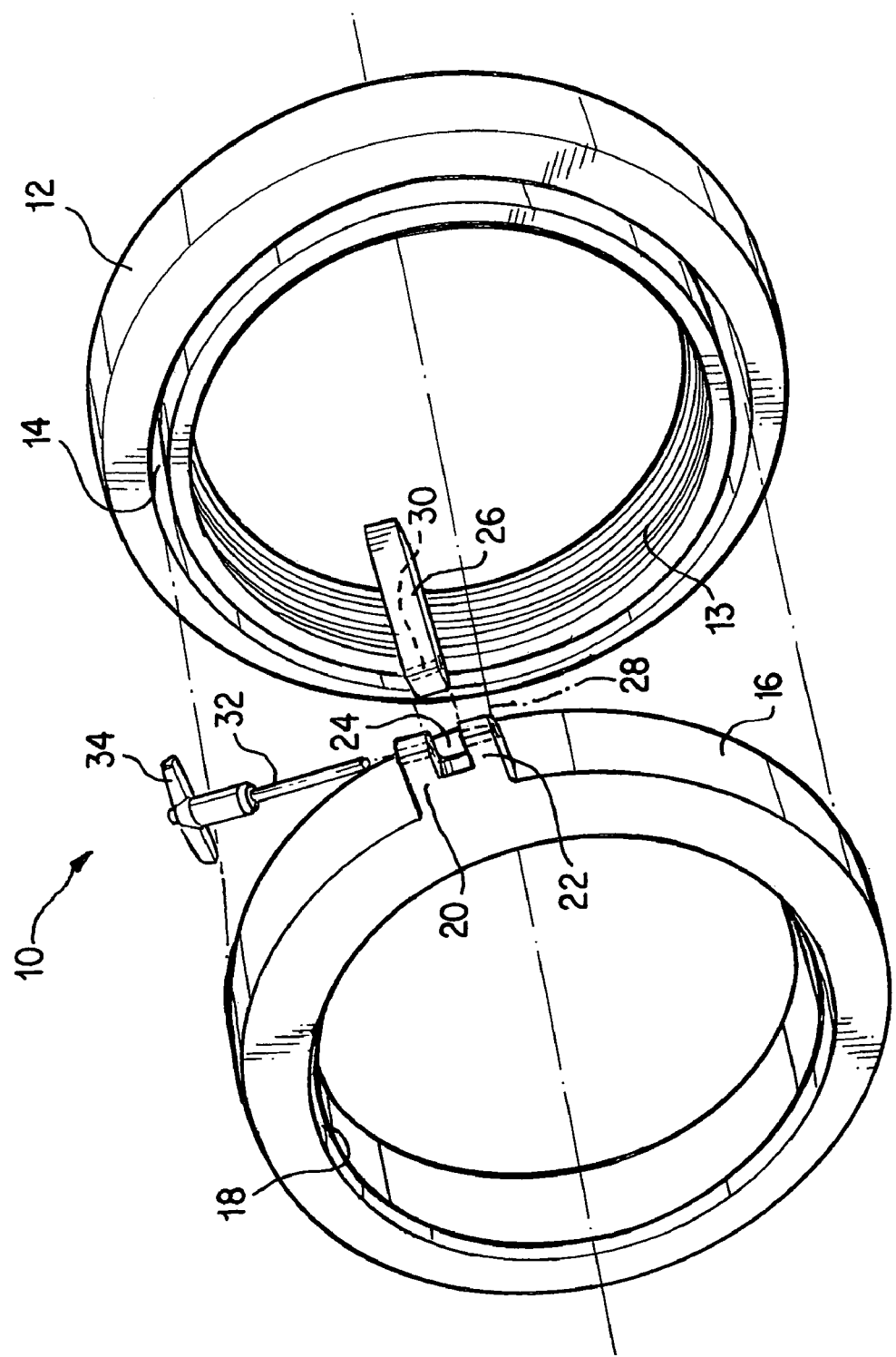
FIG. 4 is an exploded perspective view of the hydraulic nut of the present invention.

Referring first to FIG. 4, there is shown the hydraulic nut of the present invention generally designated by the numeral 10. Hydraulic nut 10 comprises a nut body 12 having internal threads 13 and an annular chamber 14 to which is fed oil under pressure from a source (not shown). An annular piston 16 seats in chamber 14 and has an inwardly extending annular flange 18. The piston could have an outwardly extending annular flange (not shown). A protrusion 20 extends radially outwardly from piston 16. Protrusion 20 comprises a pair of opposed lugs 22 which define a slot 24 into which a displacement bar 26 is inserted. Lugs 22 each have a bore 28 and displacement bar 26 has a bore 30 through all of which locking pin 32 is inserted to secure the displacement bar 26 in place. Locking pin 32 has a handle 34 for ease of use. The handle 34 is shown as a T-handle but could be an L-handle or any other configuration well-known to those skilled in the art. In use, the displacement bar 26 extends in a direction substantially parallel to the axis of the hydraulic nut. The function and dimensions of displacement bar 26 will be described in more detail hereinbelow. Those skilled in the art will appreciate that while it is preferred that the nut body be internally threaded to mate with external threads on a shaft, it is possible to provide a nut body which is not threaded but which is secured to the shaft while fluid pressure is applied by other well-known means such as clamps.

Turning now to FIG. 2, there is shown bearing assembly 50 mounted on tapered shaft 52 to the point where it cannot be axially moved further by hand force alone or a predetermined distance well-known in the art as bearing to bearing seat line to line distance so it overhangs beyond the shoulder 36 of the shaft 52 by an amount "l". Nut body 12 is screwed onto threaded shaft 68 with piston 16 seated in chamber 18 and lugs 22 protruding radially outwardly from piston 16. Displacement bar 26 extends across the peripheral face 38 of nut body 12. Nut body 12 has a thickness "T". The length "L" of displacement bar 26 is denoted by the relationship L=T+a. Thus, as can be seen in FIG. 2, the end of displacement bar 26 overhangs the nut body 12 by an amount equal to "a". It will be recognized by those skilled in the art that l must be greater than "a" by a predetermined distance.

When pressure is applied to the hydraulic nut 10, the piston 16 is forced to move to the left as seen in FIG. 3, thereby pushing inner ring 54 to the left. The pressure is released when end face 40 of displacement bar 26 is flush with side face 42 of nut body 12. At that point, the end face 44 of inner ring 54 overhangs shoulder 36 of the shaft 52 by a predetermined distance l–a.

Figure 5:
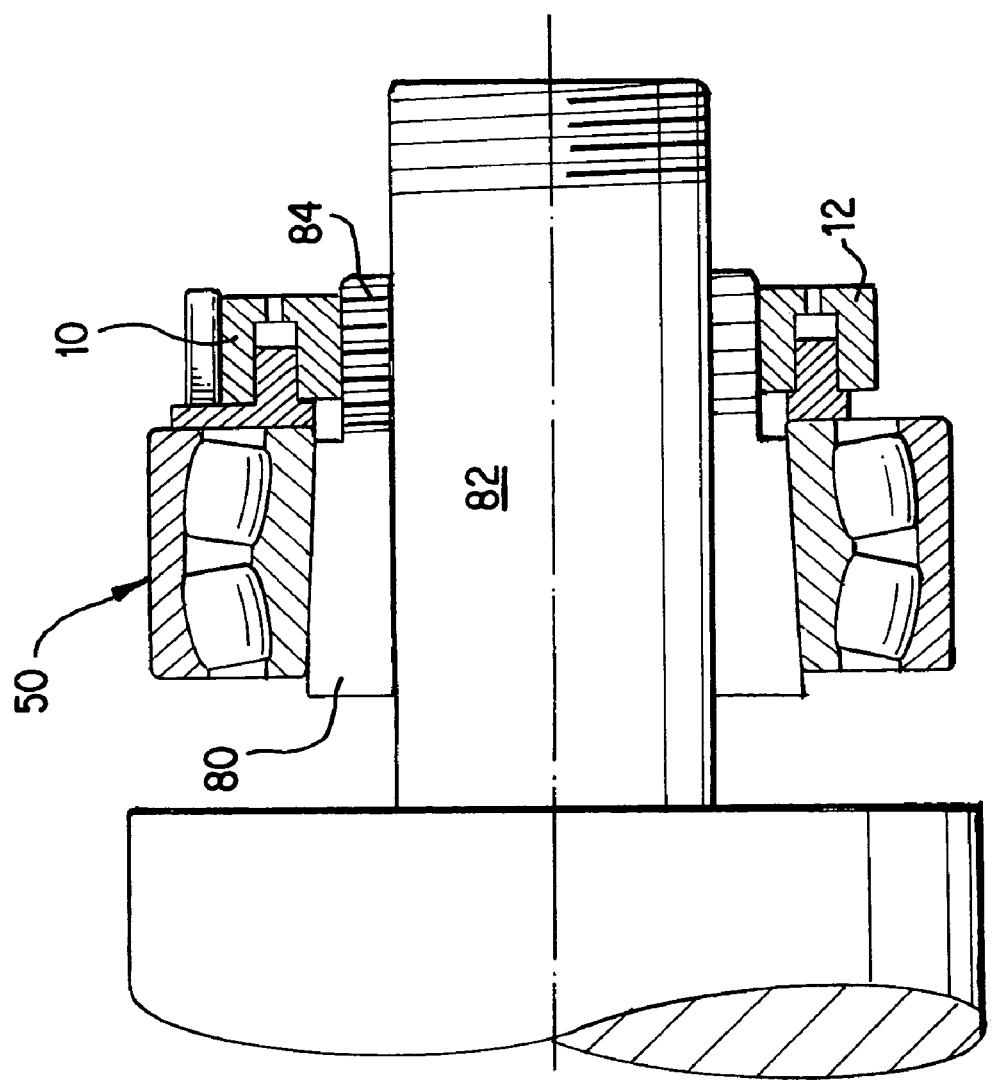
FIG. 5 is a partly schematic side elevational view in cross-section showing an adapter sleeve between a straight shaft and a bearing assembly and the hydraulic nut mounted on the adapter sleeve.

Another embodiment is shown in FIG. 5 where an adapter sleeve 80 is mounted on a shaft 82 with a bearing assembly 50 then mounted on adapter sleeve 80. Shaft 82 is not tapered but adapter sleeve 80 is tapered. In addition, shaft 82 need not be threaded but the end of adapter sleeve is threaded at 84. Nut body 12 of hydraulic nut 10 is mounted on the threaded end 84 of adapter sleeve 80. The hydraulic nut operates as described above in connection with the first embodiment.

Figure 6:
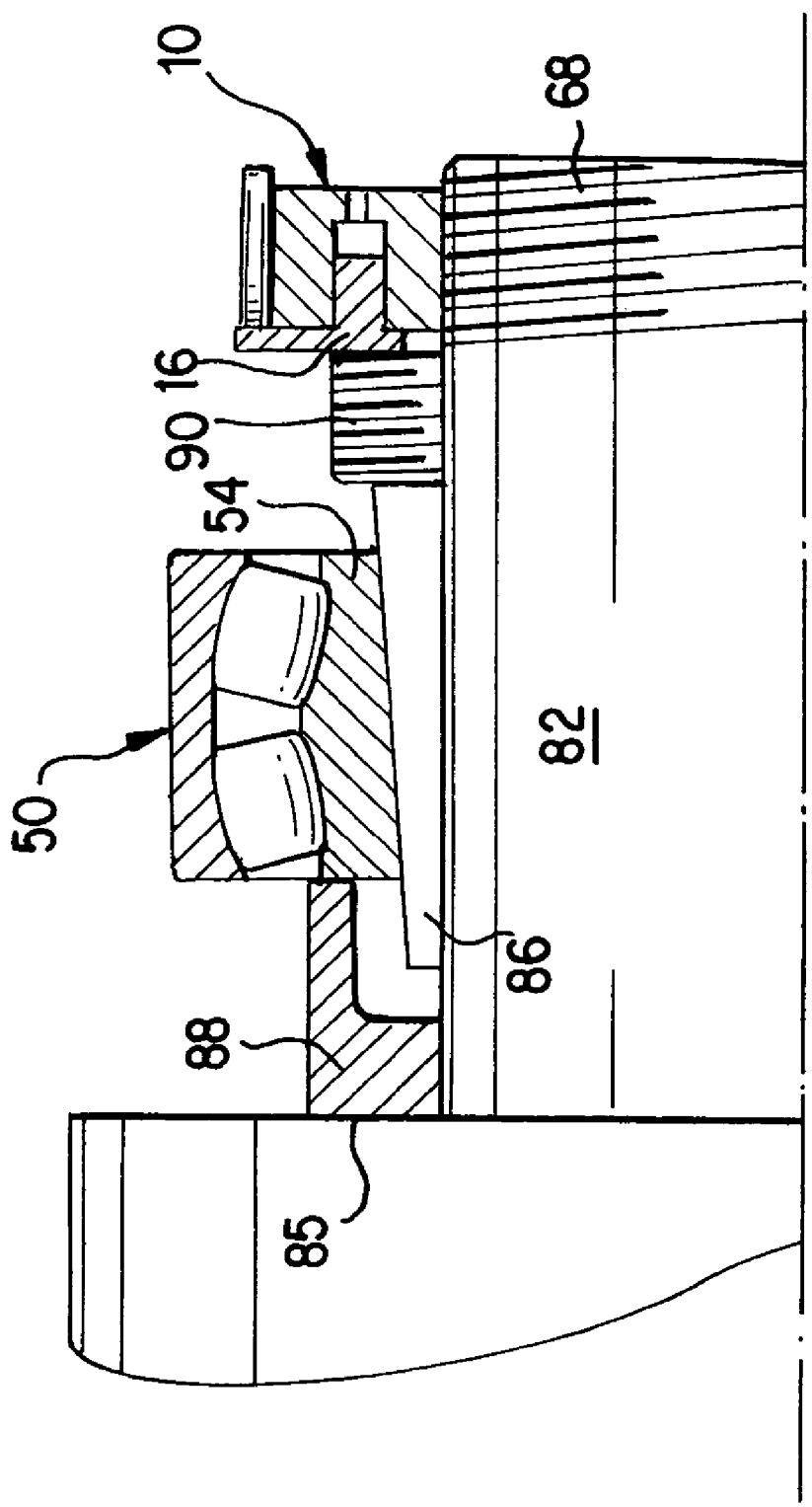
FIG. 6 is a partly schematic side elevational view in cross-section showing a removal sleeve mounted on the shaft between the shaft and the bearing assembly being mounted by a hydraulic nut.
Figure 7:
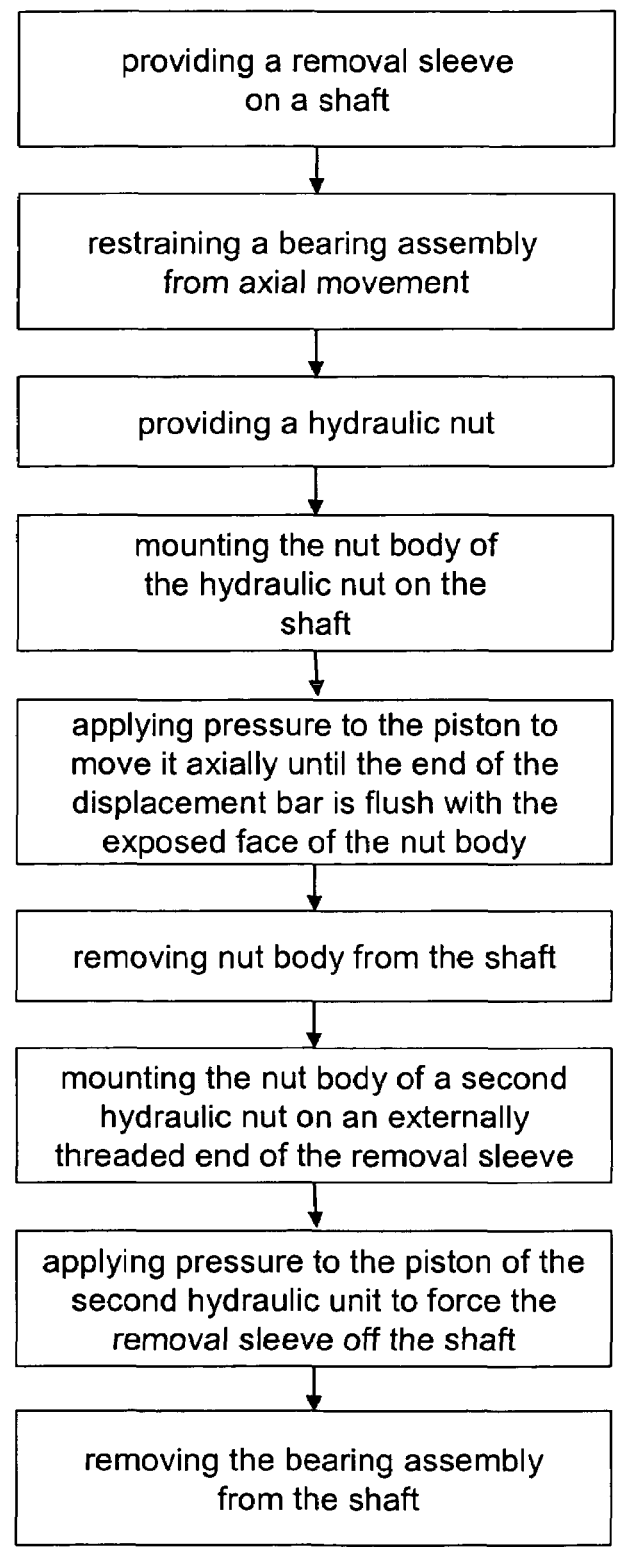
FIG. 7 is a flowchart illustrating the operation of the embodiment shown in FIG. 6.

Another embodiment is shown in FIG. 6, and its operation is illustrated in FIG. 7. In this embodiment, a removal sleeve 86 is mounted on a shaft 52 with a bearing assembly 50 then mounted on removal sleeve 86. A hydraulic nut 10 is mounted on threaded end 68 of shaft 82 in the usual manner. Piston 16 bears against the end of removal sleeve 86. Inner ring 54 of bearing assembly 50 is restrained from movement by ring 88 which rests against face 85 of shaft 82. When piston 16 pushes removal sleeve 86, inner ring 54 cannot move axially so removal sleeve 86 is forced between shaft 82 and inner ring 54, thereby radially separating the bearing assembly 50 from the shaft 82. To separate removal sleeve 86 from shaft 82, the hydraulic nut 10 is removed from thread 68 and a hydraulic nut is then screwed onto threaded end 90 of removal sleeve 86. When the hydraulic nut is actuated, the piston pushes against inner ring 54 but, since inner ring 54 is restrained from axial movement by ring 88, the nut body which is mounted on the removal sleeve is forced to move axially to the right as seen in FIG. 6, thereby removing removal sleeve 86. The loosened bearing assembly can then be easily removed.

It will be appreciated that by using the inventive hydraulic nut, the user does not have to periodically stop the hydraulic pressure and measure the movement of the bearing assembly with a feeler gage as with the prior art hydraulic nuts. When the displacement bar 26 has moved to where its end face 40 is flush with side face 42 of the nut body 12, the pressure is released. This is done by a visual inspection instead of by reading a dial and then referring to calibration tables. Of course, a measurement with a feeler gauge at that point is desirable and further adjustment can then be made as necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic nut comprising:
   (A) an annular nut body having a thickness T and having an annular chamber in one face thereof;
   (B) a piston coaxially disposed in said chamber and axially displaceable therein, said piston having a radially extending protrusion;
   (C) a displacement bar removably mounted on said protrusion and extending across and outside the periphery of said nut body in a direction substantially parallel to the axis of said nut body;
   (D) said displacement bar having a length L=T+a where "a" is a predetermined distance for axial movement of said piston;
   (E) whereby the displacement bar provides a simple and convenient visual indicator for indicating when the predetermined distance bas been traveled.

2. A hydraulic nut as claimed in claim 1, wherein said nut body is internally threaded.

3. A hydraulic nut as claimed in claim 1, wherein said nut body further comprises a fluid passage operatively communicating with said chamber.

4. A hydraulic nut as claimed in claim 1, wherein said protrusion comprises a pair of opposed lugs defining a slot therebetween.

5. A hydraulic nut as claimed in claim 4, wherein said lugs each have a through bore, said displacement bar has a through bore at one end thereof, said displacement bar is disposed in said slot with said through bores in alignment, and a locking pin is inserted in said bores to secure the displacement bar in place.

6. A hydraulic nut as claimed in claim 1, wherein said piston further comprises an outwardly directed annular flange, wherein said protrusion extends outwardly from said flange.

7. A hydraulic nut as claimed in claim 1, wherein said piston further comprises an inwardly directed annular flange.

8. A device for determining the displacement of a piston in a hydraulic nut which comprises:
   (A) an annular nut body having a thickness T and having an annular chamber in one face thereof; and
   (B) said piston coaxially disposed in said chamber and axially displaceable therein, said piston having a radially extending protrusion;
   said device comprising:
   (C) a displacement bar removably mounted on said protrusion and extending across and outside the periphery of said nut body in a direction substantially parallel to the axis of said nut body;
   (D) said displacement bar having a length L=T+a where "a" is a predetermined distance for axial movement of said piston,
   (E) whereby the displacement bar provides a simple and convenient visual indicator for indicating when the predetermined distance bas been traveled.

9. A hydraulic nut as claimed in claim 8, wherein said nut body is internally threaded.

10. A hydraulic nut as claimed in claim 8, wherein said nut body further comprises a fluid passage operatively communicating with said chamber.

11. A hydraulic nut as claimed in claim 8, wherein said protrusion comprises a pair of opposed lugs defining a slot therebetween.

12. A hydraulic nut as claimed in claim 11, wherein said lugs each have a through bore, said displacement bar has a through bore at one end thereof, said displacement bar is disposed in said slot with said through bores in alignment, and a locking pin is inserted in said bores to secure the displacement bar in place.

13. A hydraulic nut as claimed in claim 8, wherein said piston further comprises an outwardly directed annular flange, wherein said protrusion extends outwardly from said flange.

14. A hydraulic nut as claimed in claim 8, wherein said piston further comprises an inwardly directed annular flange.

15. A method for mounting a hollow article on a shaft comprising:
   (A) sliding said hollow article on said shaft until it reaches a first position;
   (B) providing a hydraulic nut which comprises:
      (1) an annular nut body having a thickness T and having an annular chamber in one face thereof;
      (2) a piston coaxially disposed in said chamber and axially displaceable therein, said piston having a radially extending protrusion;
      (3) a displacement bar removably mounted on said protrusion and extending across and outside the periphery of said nut body in a direction substantially parallel to the axis of said nut body providing a simple and convenient visual indicator;
      (4) said displacement bar having a length L=T+a where a is a predetermined distance for axial movement of said piston, one end of said displacement bar extending past an exposed face of said nut body by an amount equal to "a";
   (C) mounting said nut body on said shaft with said piston abutting said hollow article;
   (D) applying pressure to said piston to move it axially until the end of said displacement bar is flush with the exposed face of said nut body, whereby said piston pushes said hollow article a distance equal to "a" to a second position on said shaft.

16. A method as claimed in claim 15, wherein said shaft is a tapered shaft.

17. A method as claimed in claim 16, wherein said hollow article is a bearing assembly.

18. A method as claimed in claim 16, wherein said shaft has an externally threaded portion, said nut body is internally threaded, and said nut body is screwed onto said shaft.

19. A method as claimed in claim 16, wherein pressure is applied to said piston by admitting a fluid under pressure to said chamber through a fluid passage operatively communicating with said chamber.

20. A method as claimed in claim 19, wherein said fluid is an oil.

21. A method as claimed in claim 15, wherein said protrusion comprises a pair of opposed lugs defining a slot therebetween.

22. A method as claimed in claim 21, wherein said lugs each have a through bore, said displacement bar has a through bore at one end thereof, said displacement bar is disposed in said slot with said through bores in alignment, and a locking pin is inserted in said bores to secure the displacement bar in place.

23. A method as claimed in claim 15, wherein said piston further comprises an outwardly directed annular flange, wherein said protrusion extends outwardly from said flange.

24. A method as claimed in claim 15, wherein said piston further comprises an inwardly directed annular flange.

25. A method as claimed in claim 15, wherein said hollow article is an adapter sleeve and a further hollow article is mounted on said adapter sleeve.

26. A method for demounting a hollow article from a shaft comprising:
- (A) providing a removal sleeve on said shaft until it reaches a first position;
- (B) restraining said hollow article from axial movement;
- (C) providing a hydraulic nut which comprises:
  - (1) an annular nut body having a thickness T and having an annular chamber in one face thereof;
  - (2) a piston coaxially disposed in said chamber and axially displaceable therein, said piston having a radially extending protrusion;
  - (3) a displacement bar removably mounted on said protrusion and extending across and outside the periphery of said nut body in a direction substantially parallel to the axis of said nut body providing a simple and convenient visual indicator;
  - (4) said displacement bar having a length $L=T+a$ where a is a predetermined distance for axial movement of said piston, one end of said displacement bar extending past an exposed face of said nut body by an amount equal to "a";
- (D) mounting said nut body on said shaft with said piston abutting said removal sleeve;
- (E) applying pressure to said piston to move it axially until the end of said displacement bar is flush with the exposed face of said nut body, whereby said piston pushes said removal sleeve a distance equal to a second position on said shaft, thereby forcing said removal sleeve between said shaft and said hollow body;
- (F) removing said nut body from said shaft;
- (G) mounting a nut body of a second hydraulic nut on an externally threaded end of said removal sleeve such that the piston of said second hydraulic nut bears against said hollow body;
- (H) applying pressure to the piston of said second hydraulic nut to thereby force said removal sleeve off said shaft; and
- (I) removing said hollow body from said shaft.

* * * * *